Figure 1:
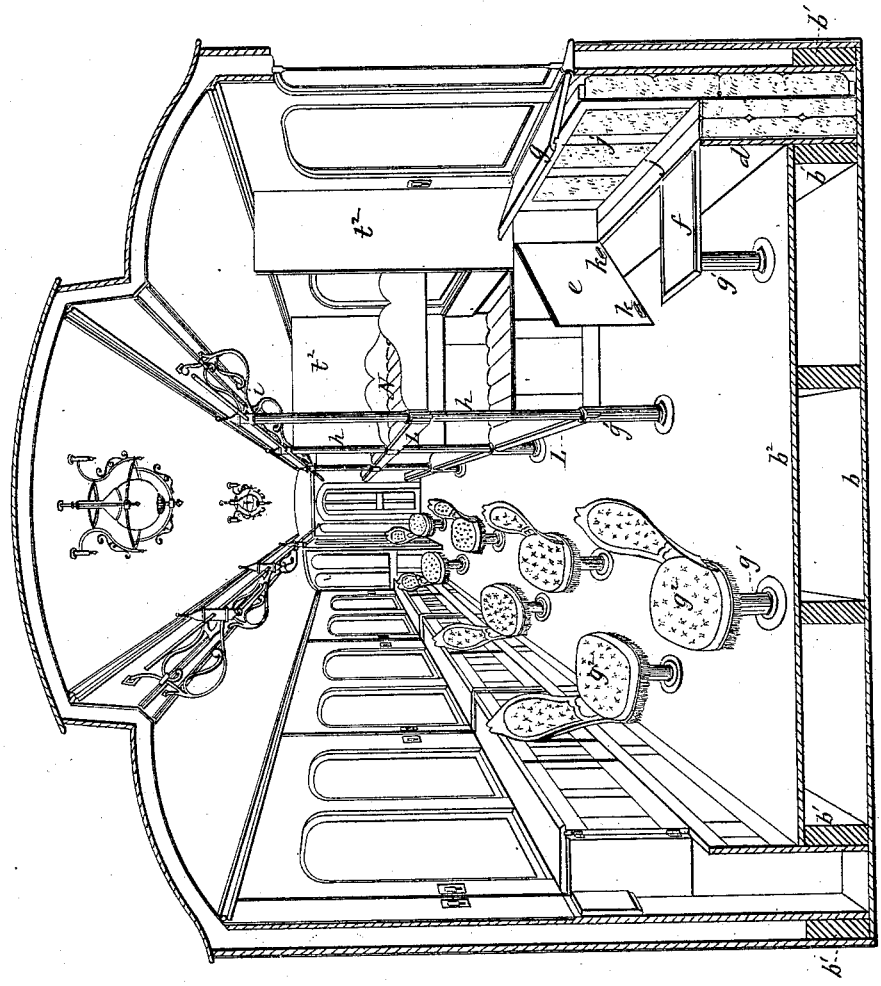

(No Model.)  
7 Sheets—Sheet 1.

E. P. KELLOGG.
SLEEPING CAR.

No. 279,954. Patented June 26, 1883.

Witnesses:  
F. L. Browne  
Edmond Brodhay

Inventor:  
pro Eugene P. Kellogg  
Johnson & Johnson  
(Attys)

(No Model.)  7 Sheets—Sheet 2.
E. P. KELLOGG.
SLEEPING CAR.
No. 279,954.  Patented June 26, 1883.
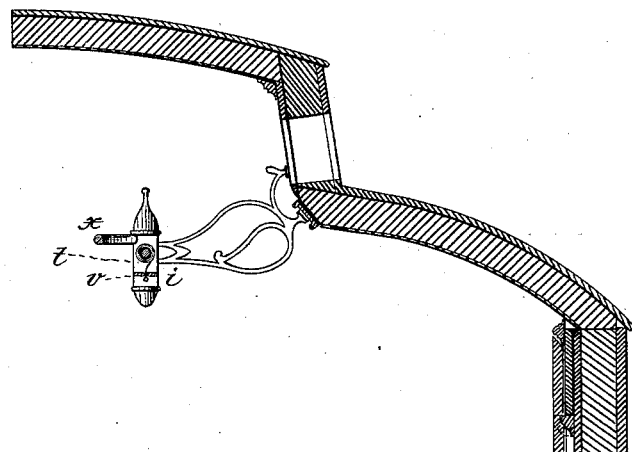
Fig. 2.
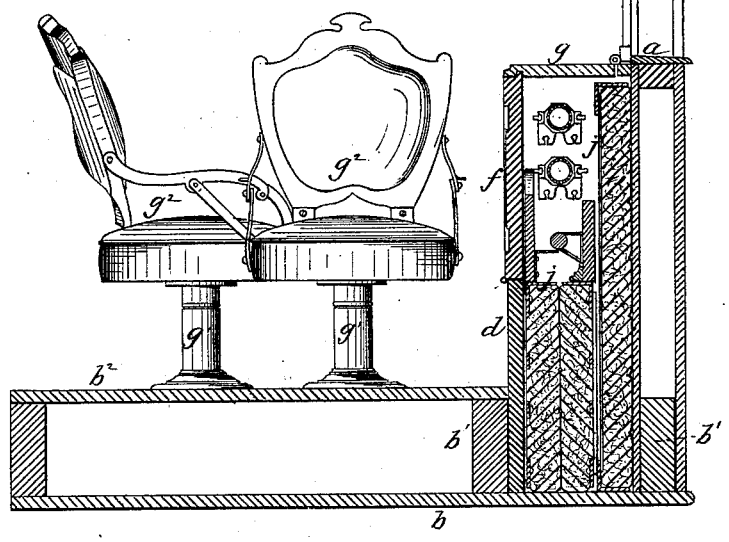
Witnesses:
F. L. Burne
Edmund Brodhag
Inventor:
pro Eugene P. Kellogg,
Johnson & Johnson,
Attys (No Model.) 7 Sheets—Sheet 3.

E. P. KELLOGG.
SLEEPING CAR.

No. 279,954. Patented June 26, 1883.

Witnesses:
F. L. Browne
Edmond Brodhag

Inventor:
pro Eugene P. Kellogg
Johnson and Johnson
Attys (No Model.) 7 Sheets—Sheet 4.
E. P. KELLOGG.
SLEEPING CAR.
No. 279,954. Patented June 26, 1883.
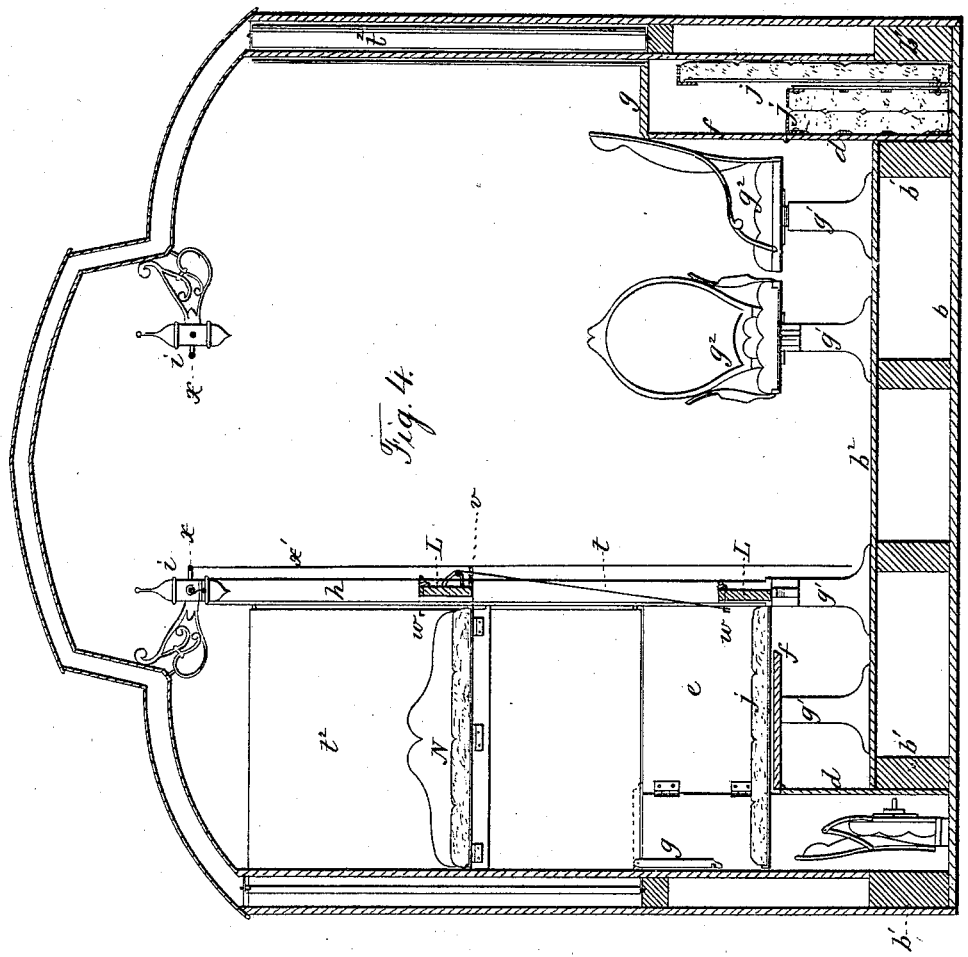

(No Model.)
E. P. KELLOGG.
SLEEPING CAR.
No. 279,954.  Patented June 26, 1883.
7 Sheets—Sheet 5.
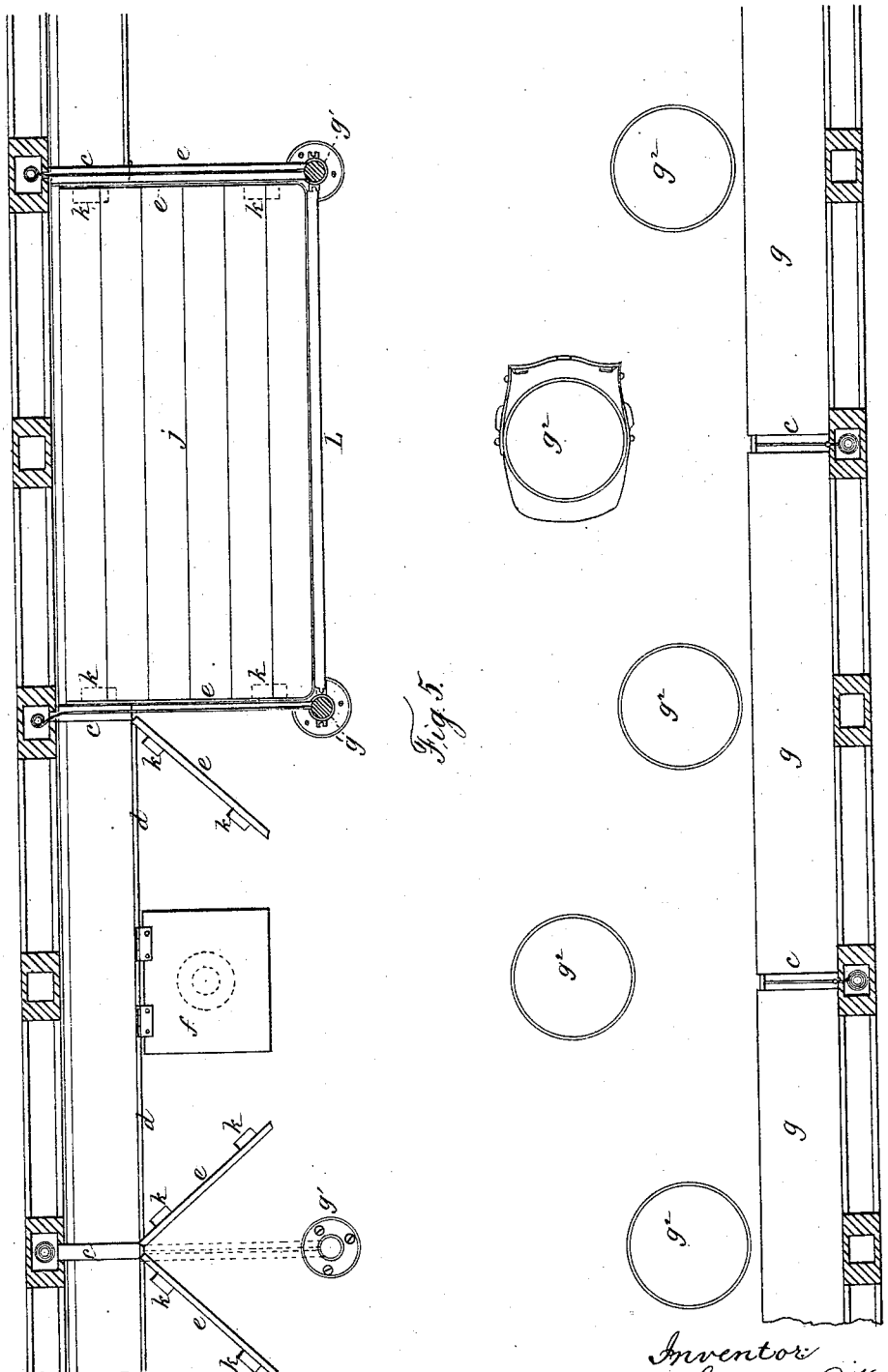
Witnesses:
F. L. Browne
Edmond Brodhag
Inventor:
pro Eugene P. Kellogg
Johnson and Johnson
Attys (No Model.) 7 Sheets—Sheet 6.
E. P. KELLOGG.
SLEEPING CAR.
No. 279,954. Patented June 26, 1883.
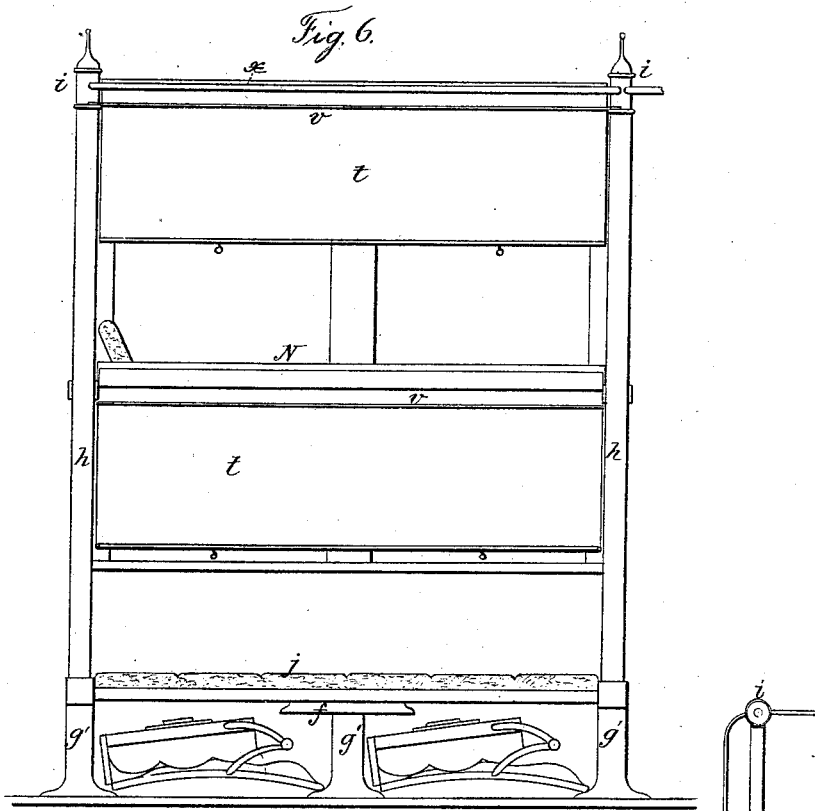
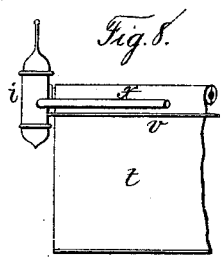
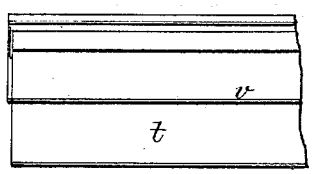
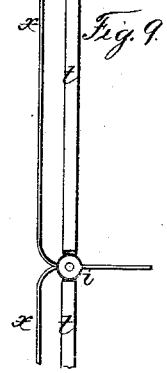
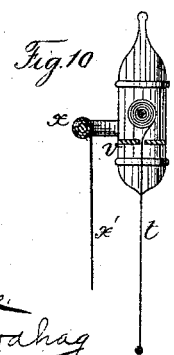
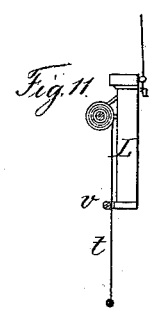
Witnesses:
F. L. Browne
Edmond Brodhag
Inventor:
pro Eugene P. Kellogg,
Johnson & Johnson
(Attys)

(No Model.)  7 Sheets—Sheet 7.

E. P. KELLOGG.
SLEEPING CAR.

No. 279,954.  Patented June 26, 1883.

Witnesses:
F. L. Browne
Edmond Brodhag

Inventor:
pro Eugene P. Kellogg,
Johnson and Johnson
Att'ys

UNITED STATES PATENT OFFICE.

EUGENE P. KELLOGG, OF NEW YORK, N. Y.

SLEEPING-CAR.

SPECIFICATION forming part of Letters Patent No. 279,954, dated June 26, 1883.

Application filed March 15, 1882. Renewed November 1, 1882. (No model.)

*To all whom it may concern:*

Be it known that I, EUGENE P. KELLOGG, a citizen of the United States, residing at the city and county of New York, in the State of New York, have invented new and useful Improvements in Sleeping-Cars, of which the following is a specification.

The style of sleeping-car which I have improved is that patented to me August 14, 1877, No. 194,154, which is constructed and adapted with special reference for converting a sleeping-car for night travel into what is known as a "parlor-chair car" for day travel.

My present improvements are directed to increase the comfort of the traveling public and to adapt the car to the requirements alike for day and for night travel, as will be hereinafter described and made the subject of specific claim.

My said patent embraces, among other things, a construction involving the use of fixed side seats, which, under my new organization, are dispensed with.

Railway-cars have been constructed with wall recesses in various ways adapted to receive the upper-berth frame and its bedding, so that said frame forms the cover for said recess, and requires the removal or partial removal of the window-sills and the removal of the wall-studding between the windows, thereby weakening the car-walls. I construct fixed lockers along the inner side walls of the car, extending from the window-sills below the upper floor, between the two outside longitudinal bed-timbers, and adapted to receive the upper and the lower-berth-frames, their bedding, and other parts of the berth structure, leaving the car-wall and window-sills intact. The upper portion of the front side of each locker is divided into three sections, two of which are hinged to open horizonally to form the end supports for the lower-berth frame, and the middle section is hinged to open downward, these three sections being so constructed to give free access to the locker to allow the berth when made up to extend therein against the car-wall, and to close the locker when the berth parts are placed therein. The top of the locker is also hinged that it may be turned up out of the way in placing and removing the berth-frames. This construction provides for the lower berth, and gives a convenient and comparatively close arrangement of chairs upon fixed pedestals for day travel. Removable stanchions are used upon the fixed pedestals for supporting the outer portion of the upper and lower berth frames, as in my said patent. In connection with the usual parting curtains, I provide each berth with a curtain under the control of the occupant, for greater privacy and safety from robbery.

Figure 3:
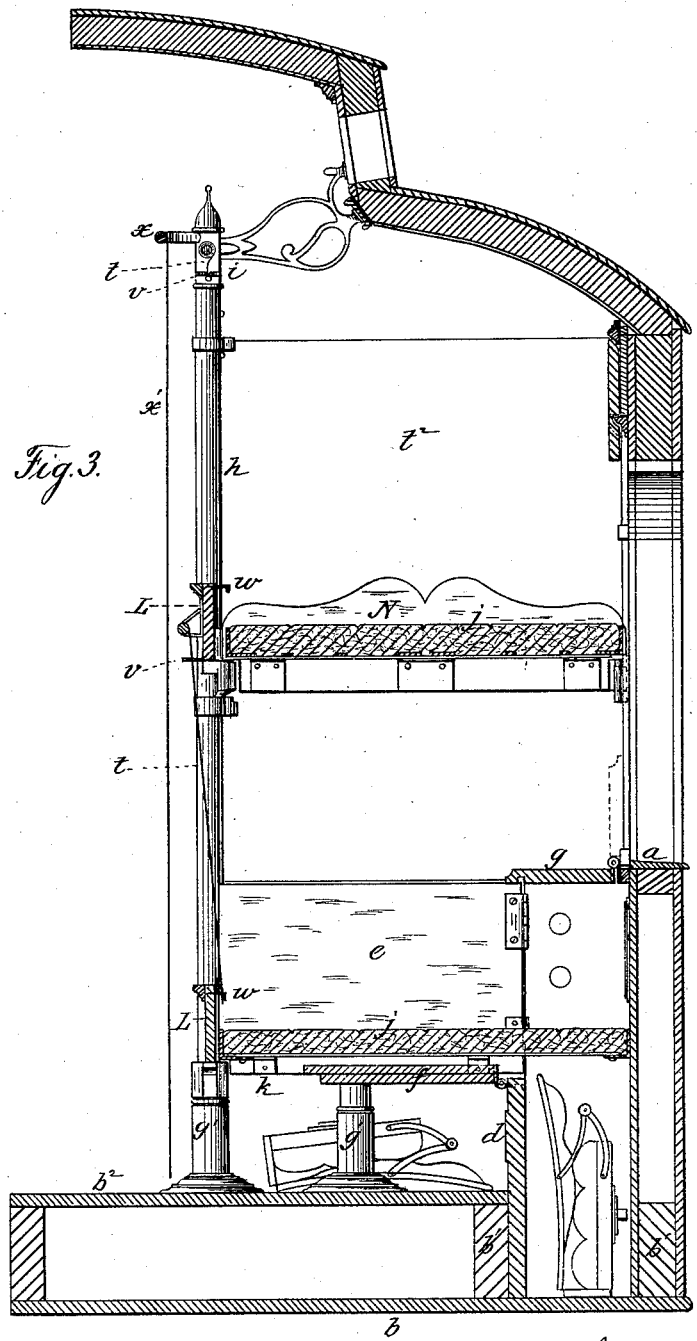

Referring to the accompanying drawings, Figure 1 represents a car in cross-section, the interior appearing in perspective, showing the arrangement of the parlor-chairs on one side of the car and on the other the sleeping-berths, the locker on the right exposing the bed-frames therein; Fig. 2, a cross-section on an enlarged scale of half of the car as arranged with parlor-chairs for day travel; Fig. 3, a similar section, showing the berths made up for night travel; Fig. 4, a cross-section showing one side adapted for day travel and the other side with the sleeping-berths, the said section being taken through the wall spring-roller curtains, one of which is shown rolled in the wall-recess and the other drawn out to divide the berths. Fig. 5 is a horizontal section, showing a lower berth made up and the hinged front sections of one of the adjacent lockers in open position, the lockers on the other side of the car being shown as closed and the chairs placed upon the pedestals; Fig. 6, a front view of one of the sleeping-berths made up, showing the spring-roller curtains partially drawn down. Figs. 7, 8, 9, 10, and 11 represent details of the curtain-holders and guides; and Fig. 12, a floor plan, showing the lockers, the arrangement of the chair-pedestals, the closets, wash-rooms, &c.

Along the walls of the inner sides of the car I construct lockers adapted to receive the bed-frames and other berth-forming parts, each locker being equal to the space between two windows, projecting about a foot from the wall and extending from the window-sills *a* to lower floor, *b*, of the car, between the longitudinal bed-sills *b' b'*, leaving the double walls and the window-sills intact for strength. Each locker is separated by end partitions, *c c*, and its front side is divided horizontally by a lower fixed part, *d*, and upper hinged sections, *e e* and $f$, the sections $e\ e$ being hinged to the locker end partitions, $c\ c$, so as to be opened to form the end boards of the lower berth, and the middle section, $f$, hinged to the upper edge of the lower fixed part, $d$, so as to be opened downward out of the way, so as to leave the upper front portion of the locker uncovered when these sections are so opened, as shown in Figs. 3 and 4. The cover $g$ of the locker is hinged to the car-wall, and forms an arm-rest and table for packages. These several hinged sections, when closed as shown in Fig. 2, are secured in any suitable manner so that they cannot be opened by the passengers. The division of the upper front part of the locker into three sections is to provide a clear way for the lower berth into the locker over its lower fixed part, $d$, and against the car-wall, as shown in Figs. 3 and 4, and to give the right length to the end sections, $e\ e$, to form the berth end boards, which, when so placed, stand in line with the locker fixed end partitions, and practically form extensions of said partitions from the car-wall, as shown in Fig. 5. By this construction the lower berth occupies the upper portion of the locker and the middle hinged section, $f$, is beneath the berth. The horizontal dividing-line of the front of the locker is a little below the middle of its height from the window-sills $a$ to the upper car-floor, $b^2$, so as to give the proper height for the lower berth.

Figure 12:
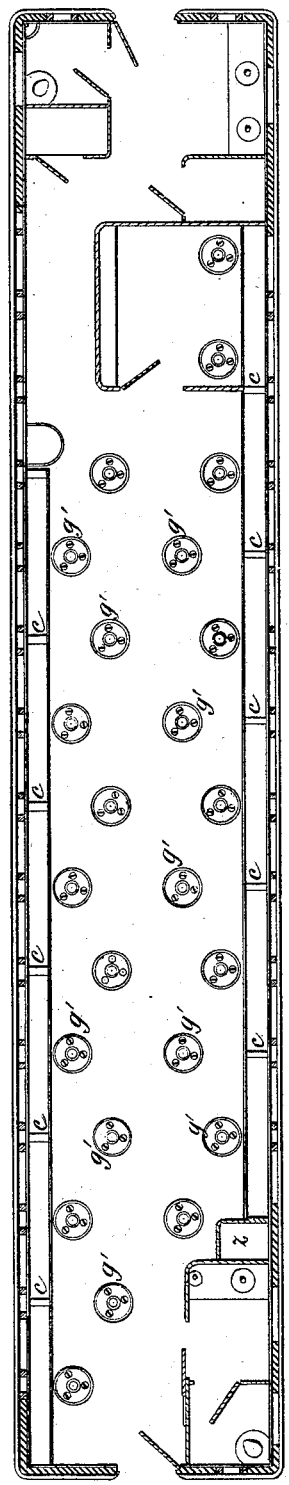

Pedestals $g'$, adapted to support chairs $g^2$, are fixed in the car-floor, and disposed as shown in Figs. 5 and 12—that is, such a pedestal is placed near the locker opposite each alternate window-division, while nearer the middle of the car intermediate pedestals are placed, so as to give a free passage through the car. The adaptation of the pedestals for parlor-chairs adapts them also to receive and support stanchions $h$, the upper ends of which are suitably secured in brackets $i$, fastened to the top of the car, as shown in Figs. 1 and 2. The pedestals near the middle of the car are arranged, as shown, opposite the end partitions, $c\ c$, of the lockers for the purpose of supporting the stanchions in positions to hold the hinged sections $e\ e$ of the locker-front when turned out to form the end boards of the lower berth, as shown in Figs. 3, 4, and 5. The length of these hinged sections must be such as to bring them, when opened, against the stanchions, so that when the berth is made up the bed-frame will hold the said hinged sections in place against the stanchions, and for this purpose the free ends of the sections $e\ e$ are beveled to fit the pedestal.

The bed-frame $j$ may be of any suitable construction, is adapted to be placed between the opened sections $e\ e$, and to extend from the stanchions into the locker against the car-wall and be supported in such position upon angle-irons $k$, secured to the inner sides of the said sections $e\ e$ at their lower edges, as shown in Figs. 3 and 5. The hinged sections, therefore, while serving as parts of the locker-front, serve also as the means for supporting the bed-frame, and as end boards for the berth in connection with the partitions of the lockers.

The lower berth is sufficiently high to allow the middle locker-front section $f$ to be supported upon the top of the pedestal near the locker, and it may be so supported as to serve as a support for the middle of the bed-frame if found desirable.

The cover $g$ of the locker is shown in Fig. 3 as resting upon the locker ends over the wall side of the berth; but it may be turned up or down and secured to the car-wall when the berth is made up, as shown by dotted lines.

I have described the locker-front hinged section $e\ e$ as forming the end boards of the lower berth, and it will be understood that these hinged sections of each locker, when opened against the stanchions, will join each other, or nearly so, and be supported alike by the stanchions as independent supports and end boards for each berth, so that the berths can be made separately. In Fig. 5 I have shown these hinged sections as partially opened from one locker, and if they were fully opened they would have the relation to each other and to the stanchions as stated.

The upper berth is arranged and supported upon the car-wall and upon the stanchions as in my said patent, or in any suitable way in which the end rails, M, are secured to the car-wall and to the stanchions, and support the bed-frame N by angle-irons.

Each berth is provided with an independent front rail, L, suitably secured in sockets on the stanchions. The front rail of the middle berth is provided with a spring-roller curtain, $b$, and a curtain-stop, $v$, as shown in Figs. 3, 7, and 11, and the front rail of the lower berth is provided with buttons $w$, by which the occupant of said lower berth can draw down said curtain $t$ and fasten it by loops to said buttons. The brackets for the upper ends of the stanchions are also provided with a spring-roller curtain $t$ and a curtain-stop, $v$, as shown in Figs. 3, 8, 9, and 10, and the front rail of the upper berth is provided with buttons $w$, by which the occupant can draw down and fasten said curtain to the buttons. The stanchion-brackets are also provided with a rail, $x$, to which a parting-curtain, $x'$, is attached, so as to hang outside of the spring-curtains, as shown in Fig. 3. The inside curtains are thus placed under the control of the occupants of the berths, and give greater privacy, and when fastened as described give greater safety to the occupants against loss of valuables.

The spring-roller curtain for the upper berth is a fixture with the brackets, and the curtain-stop $v$ is a slotted plate secured to the brackets in position below the roller to stop the curtain-rod, as shown in Figs. 3, 9, 10. The spring-roller curtain for the lower berth and the curtain-stop are fixtures with the front rail of the upper berth, as shown in Figs. 7 and 11, and the curtain is rolled and is held by the stop $v$ when said rail is put in the locker.

The divisions for the berths may be formed by spring rolling curtains $t^2$, adapted to roll within a recess in the car-wall and to be drawn out therefrom in positions between the end rails of the upper berths and be fastened to the stanchions as in my said patent; or such divisions may be formed in any other suitable way.

For day travel the bed-frames of both berths are placed in the locker, one of such bed-frames being folded to give room for placing the front and end rails and one of the stanchions in the locker upon and over the folded bed, as shown in Fig. 2. In the disposition of the berth-supporting stanchions shown in Figs. 5 and 12 there will be one for each locker; or they may be placed in a closet, $z$, next the ladies' toilet-room, while the pillows and bed-covering may be placed in the state-room, and the pedestals provided with chairs throughout the car. The chairs are of a construction to adapt them to be folded, and when the car is changed for night travel the chairs are folded, and can be placed out of the way under the lower berths or within the locker, as shown in the drawings.

In Fig. 12 I have shown the arrangement for the convenience-rooms.

I claim—

1. In a convertible sleeping and chair car, the lockers arranged upon the inner side walls of the car in a connected range, one for each berth, having each a front of fixed and hinged sections, and a hinged top and extending from the window-sills to the lower floor of the car, the said hinged front sections being adapted to open to form the supports and ends of the berth and to uncover the locker-space above the fixed front section, substantially as described.

2. In a convertible sleeping and chair car, the lockers constructed upon the lower inner side walls, having fixed end partitions, front hinged sections, and a cover, and extending from the window-sills to the lower car-floor between the bed-sills, substantially as described, for the purpose specified.

3. The wall-lockers for a convertible sleeping and chair car, constructed upon the inner side walls, extending from the window-sills to the lower car-floor between the bed-sills, having a front of fixed and hinged sections, fixed end partitions, and a hinged cover, substantially as described, for the purpose specified.

4. The combination, substantially as hereinbefore set forth, in a convertible sleeping and chair car, of the fixed floor-pedestals, adapted to support interchangeable chairs and stanchions, with wall-lockers, having sections hinged and constructed and arranged to be opened and supported against said stanchions to support the lower-berth bed-frame, to form, in connection with end locker-partitions, the end boards for the lower berth and a clear way for the extension of the bed-frame into and over the locker-space.

5. The combination substantially hereinbefore set forth, in a convertible sleeping and chair car, of lockers arranged upon the inner side walls of the car in a connected range, one for each berth, and having a front of hinged sections with removable posts or stanchions, against which said front hinged sections are arranged to open in forming the berth.

6. The combination, with separate wall-lockers having their fronts divided into three hinged sections, of the fixed floor-pedestals, adapted to support, interchangeably, chairs and stanchions, and to support the middle hinged section of said locker, substantially as herein set forth.

7. A convertible sleeping and chair car having upon its inner side walls a range of lockers separated by fixed partitions joining the window-sills and extending below the upper car-floor, and fixed pedestals disposed upon the car-floor in the relation to said lockers substantially as herein shown, and for the purpose specified.

8. The combination, with the sleeping-berth of a railway-car, of the outer parting-curtain and the separate roller-curtains for each berth, the curtain-stops, and means whereby the said roller-curtains may be secured to the front berth-rails.

9. The fixed top brackets for the berth-supporting stanchions, provided with the outer curtain-rail, the roller-curtain, and the curtain-stop, in combination with the front rail of the upper berth, provided with means for securing said curtain when closed, as described.

10. The removable front rail of the upper berth, provided with the roller-curtain and the curtain-stop, in combination with the front rail of the lower berth and means for securing said roller-curtain when closed, as shown and described.

In testimony whereof I have hereunto set my hand in the presence of two subscribing witnesses.

EUGENE P. KELLOGG.

Witnesses:
F. B. CHICHESTER,
C. M. TRUMAN.